(12) United States Patent
Bernstein et al.

(10) Patent No.: US 6,501,294 B2
(45) Date of Patent: Dec. 31, 2002

(54) NEURON CIRCUIT

(75) Inventors: Kerry Bernstein, Underhill, VT (US); Norman Jay Rohrer, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/842,736

(22) Filed: Apr. 26, 2001

(65) Prior Publication Data

US 2002/0167332 A1 Nov. 14, 2002

(51) Int. Cl.[7] .............................. H03K 19/23; G06N 3/02
(52) U.S. Cl. .............................. 326/36; 326/11; 326/81; 326/119; 706/15; 706/41; 706/43
(58) Field of Search .............................. 326/11, 81, 119, 326/36, 35; 706/15, 41, 43; 327/52, 215

(56) References Cited

U.S. PATENT DOCUMENTS

| | | |
|---|---|---|
| 4,956,564 A | 9/1990 | Holler et al. |
| 4,961,002 A * | 10/1990 | Tam et al. ................ 307/201 |
| 5,258,657 A | 11/1993 | Shibata et al. |
| 5,336,937 A | 8/1994 | Sridhar et al. |
| 5,463,330 A * | 10/1995 | Tsuchida ................ 326/81 |
| 5,621,336 A | 4/1997 | Shibata et al. |
| 5,704,014 A | 12/1997 | Marotta et al. |
| 5,806,054 A | 9/1998 | Bergemont et al. |
| 5,864,255 A | 1/1999 | Kwok et al. |
| 6,032,140 A | 2/2000 | Fabbrizio et al. |
| 6,151,594 A * | 11/2000 | Wang ................ 706/43 |
| 6,269,352 B1 * | 7/2001 | Fabbrizio et al. ........ 706/105 |

OTHER PUBLICATIONS

M.D. Voysey, and T. J. Kazmierski; "A Small, Efficient Analogue CMOS Neuron for VLSI Neural Networks," Department of Electronics and Computer Science, Southampton University, England.

* cited by examiner

Primary Examiner—Michael Tokar
Assistant Examiner—Vibol Tan
(74) Attorney, Agent, or Firm—Richard A. Henkler; Bracewell & Patterson, L.L.P.

(57) ABSTRACT

A neuron circuit that can be served as a building block for a neural network implemented in an integrated circuit is disclosed. The neuron circuit includes a synapse circuit block and a neuron body circuit block. The synapse circuit block has three transistors, and the body of one of the three transistors is controlled by a weighted input. The neuron body circuit block includes a current mirror circuit, a summing circuit, and an invertor circuit. The neuron body circuit is coupled to the synapse circuit block to generate an output pulse.

8 Claims, 2 Drawing Sheets

NEURON CIRCUIT

BACKGROUND OF THE INVENTION

1. Technical Field

The present invention relates to neural networks in general, and in particular to artificial neurons utilized within a neural network. Still more particularly, the present invention relates to a neuron circuit employed as a building block of a neural network that can be implemented in an integrated circuit.

2. Description of the Prior Art

Artificial neural networks are utilized in a wide variety of applications, such as speech recognition, process control, optical character recognition, signal processing, image processing, etc. Generally speaking, an artificial neural network is made up of multiple elemental processing blocks called neuron circuits. Thus, a neuron circuit is the fundamental building block of a neural network.

Referring now to the drawings and in particular to FIG. 1a, there is depicted a block diagram of a conventional neuron circuit. As shown, a neuron circuit 10 includes inputs $x_1$ through $x_n$ weighted by respective synapses $w_1$ through $w_n$, which are accumulated together by a summing circuit 11. The output of summing circuit 11 is then fed into a non-linear circuit 12 for generating an output 15. In this example, the non-linear transfer function of non-linear circuit 12 is in the form of a sigmoid-shaped function that can be expressed as follows:

$$\text{output} = 1/(1 + e^{-NET})$$

Many different types of non-linear transfer function can be utilized within non-linear circuit 12. For example, the non-linear transfer function can be a binary threshold function 16 having a binary threshold, as shown in FIG. 1b.

In sum, a conventional neuron circuit requires a circuit for weighted input connections, a summing circuit, a multiplier circuit, and a circuit for performing a non-linear function. Because of the total size of the above-mentioned circuits, the number of conventional neuron circuits that can be manufactured on a semiconductor device is severely limited, not to mention the response time is relatively slow. Consequently, it would be desirable to provide an improved neuron circuit that is fast, simple, and inexpensive to implement.

SUMMARY OF THE INVENTION

In accordance with a preferred embodiment of the present invention, a neuron circuit that can be served as a building block for a neural network implemented in an integrated circuit includes a synapse circuit block and a neuron body circuit block. The synapse circuit block has three transistors, and the body of one of the three transistors is controlled by a weighted input. The neuron body circuit block includes a current mirror circuit, a summing circuit, and an invertor circuit. The neuron body circuit is coupled to the synapse circuit block to generate an output pulse.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

An ideal artificial neuron can be represented by a mathematical equation as follows:

$$Y = S\left(\sum_{i=1}^{n} x_i W_i\right)$$

$Y = S(\Sigma_{i=1}^{n} x_i W_i)$ where x and W are inputs and weights of n synapses, respectively, and S(.) is the equation of a transfer function having a non-linear threshold. The derivation of the above equation stems from a biological brain cell, which will only turn on if the combined stimulus from other cells exceeds a specific physical threshold value. The implementation of a neuron described by the above equation is composed of two functional blocks, namely, a synapse circuit block and a neuron body circuit block. Typically, multiple synapse circuit blocks are connected to a single neuron body circuit block. Each of the synapse circuit blocks performs a multiplication of an input signal and a weight. The single neuron body circuit block sums the outputs of the attached synapse circuit blocks mathematically, and then passes the result onto other neuron body circuit blocks within a neural network through a transfer function.

Figure 1A:
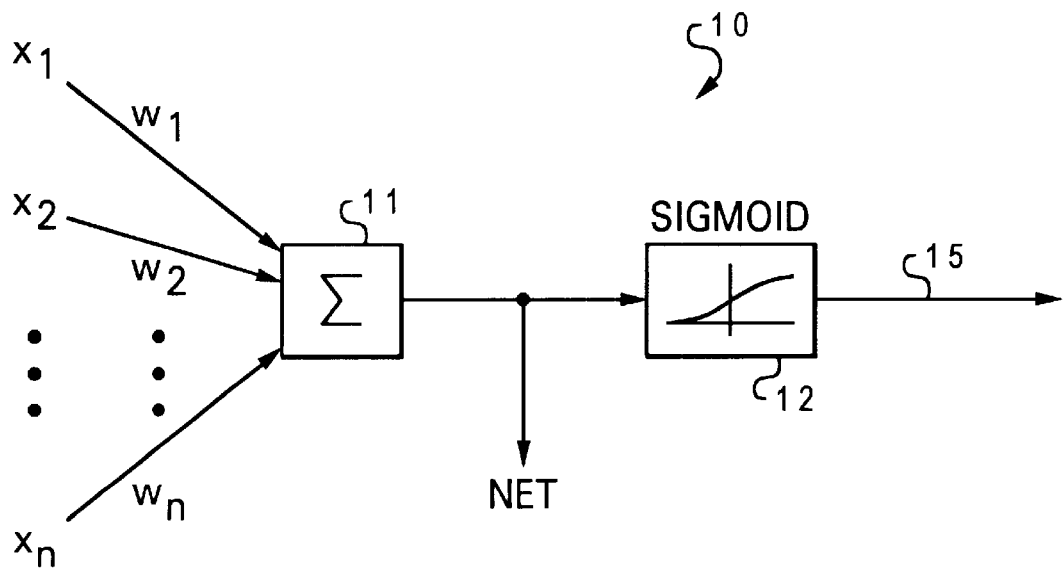
FIG. 1a is a block diagram of a first conventional neuron circuit.
Figure 1B:
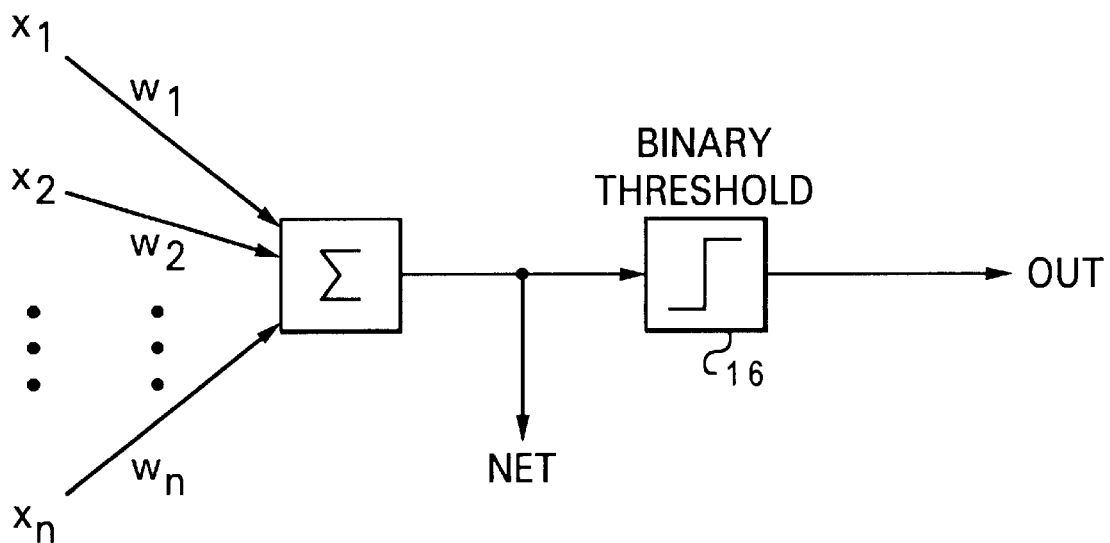
FIG. 1b is a block diagram of second conventional neuron circuit.
Figure 2:
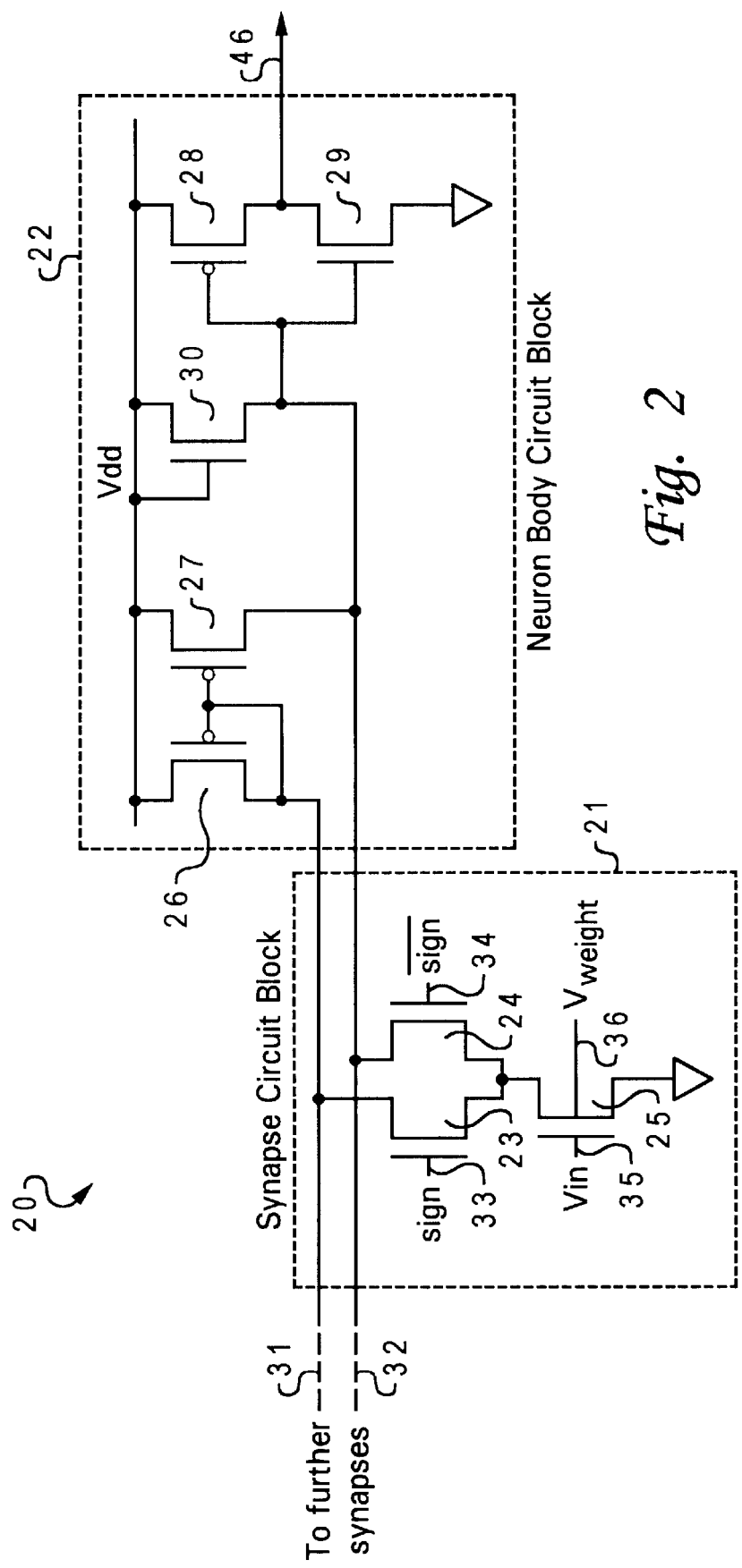
FIG. 2 is a circuit diagram of a neuron circuit, in accordance with a preferred embodiment of the present invention.

With reference now to FIG. 2, there is illustrated a circuit diagram of a neuron circuit, in accordance with a preferred embodiment of the present invention. As shown, a neuron circuit 20 includes a synapse circuit block 21 and a neuron body circuit block 22. Synapse circuit block 21 includes three n-channel transistors 23–25. The drains of transistors 23 and 24 are connected to inputs 31, 32, respectively. Inputs 31, 32 are coupled to synapse circuit blocks of other neuron circuits (not shown) within a neural network. The gate s of transistors 23 and 24 are connected to complementary sign inputs 33, 34, respectively. The sources of transistors 23, 24 are both connected to the drain of transistor 25.

The gate of transistor 25 is connected to a $V_{in}$ input 35, and the source of transistor 25 is connected to ground. Furthermore, the body of transistor 25 is connected to a $V_{weight}$ input 36. In order to enable body biasing for transistor 25, neuron circuit 20 is manufactured by a processing technology that yields a floating body, such as silicon-on-insulator (SOI) or silicon-on-sapphire (SOS), that are well-known in the art of semiconductor processing.

Neuron body circuit block 22 includes a current mirror circuit, a summing circuit, and an invertor circuit. Current mirror circuit includes two p-channel transistors 26 and 27. The drain of transistor 26 and the gates of transistors 26, 27 are connected to input 31. The drain of transistor 27 is connected to input 32. The function of current mirror is for accommodating signed weights from various synapse circuit blocks (not shown). The summing circuit, which includes an n-channel pull-up transistor 30, adds the current from various synapse circuit blocks. The invertor circuit, which includes a p-channel transistor 28 and an n-channel transistor 29, generates an output 46 for neuron circuit 20.

During operation, the amount of current passing through transistor 25 is proportional to the magnitude of voltage appears at $V_{in}$ input 35 at the gate of transistor 25. The amount of current passing through transistor 25 can be further increased by increasing the voltage value appears at $V_{weight}$ input 36 at the body of transistor 25. In essence, multiplications between voltage value at $V_{in}$ input 35 and voltage value at $V_{weight}$ input 36 can effectively be performed within transistor 25 instead of using an additional weighing transistor as it is done in the prior art.

The sign of synapse circuit 21 is decided by pass transistors 23, 24. In order to accommodate signed weights, current mirror circuit (i.e., transistor 26) in neuron body circuit block 22 reverses the effective input from transistor 23 in respective synapse circuit block 21.

The current through transistor 25, which is now the product of voltage value at $V_{in}$ input 35 and voltage value at $V_{weight}$ input 36, is then summed with currents from other synapses circuit blocks (of the same neural network) at the source of pull-up transistor 30. The voltage at this point control the invertor circuit (i.e., transistors 28 and 29), which serves to perform a non-linear transfer function. In response to the voltage at the source of pull-up transistor 30, the invertor circuit generates a signal at output 46 for neuron circuit 20.

As has been described, the present invention provides an improved neuron circuit that serves as a building block for a neural network that can be implemented in an integrated circuit.

While the invention has been particularly shown and described with reference to a preferred embodiment, it will be understood by those skilled in the art that various changes in form and detail may be made therein without departing from the spirit and scope of the invention.

What is claimed is:

1. A neuron circuit comprising:

a synapse circuit block having only three transistors, the body of one of said only three transistors is controlled by a weighted input; and a neuron body circuit block, coupled to said synapse circuit block for generating an output pulse, includes a current mirror circuit, a summing circuit, and an invertor circuit.

2. The neuron circuit of claim 1, wherein said transistors are silicon-on-insulator transistors.

3. The neuron circuit of claim 1, wherein said transistors are silicon-on-sapphire transistors.

4. The neuron circuit of claim 1, wherein two of said three transistors in said synapse circuit block are connected in parallel, each gate receiving a complementary sign input.

5. The neuron circuit of claim 1, wherein the gate of said transistor having a weighted body input is connected to a signal input such that a voltage value of said signal input is multiplied by a voltage value of said weighted input within said transistor having a weighted body input.

6. The neuron circuit of claim 1, wherein said current mirror circuit includes two p-channel transistors.

7. The neuron circuit of claim 1, wherein said summing circuit includes an n-channel pull-up transistor.

8. The neuron circuit of claim 1, wherein said invertor circuit includes a p-channel transistor and an n-channel transistor.

* * * * *